United States Patent [19]
Valentine et al.

[11] Patent Number: 4,473,249
[45] Date of Patent: Sep. 25, 1984

[54] EXTENSIBLE MANIPULATOR UNIT

[76] Inventors: Al L. Valentine, 21658 Summerdale, Southfield, Mich. 48034; Bernard Rinke, 2375 Alexander, Troy, Mich. 48084; Chester M. Wenzel, 2001 Dallas, Royal Oak, Mich. 48067

[21] Appl. No.: 374,832

[22] Filed: May 5, 1982

[51] Int. Cl.³ .............................................. B25J 15/00
[52] U.S. Cl. ...................................... 294/88; 294/104; 414/753
[58] Field of Search ......................... 294/88, 104, 115; 269/32, 34, 201, 228, 237, 239; 414/226, 732, 739, 740, 753

[56] References Cited

U.S. PATENT DOCUMENTS

| | | | |
|---|---|---|---|
| 2,473,764 | 6/1949 | Park | 294/104 X |
| 3,013,835 | 12/1961 | Blatt | 294/88 |
| 3,347,542 | 10/1967 | Mericle | 269/32 |
| 3,497,255 | 2/1970 | Sindelar | 294/88 |
| 3,565,415 | 2/1971 | Blatt | 269/32 X |
| 3,764,023 | 10/1973 | Jatcko | 414/739 |
| 4,252,361 | 2/1981 | Descoteaux | 294/88 |

*Primary Examiner*—Johnny D. Cherry
*Attorney, Agent, or Firm*—Krass & Young

[57] ABSTRACT

A pair of clamping jaws for gripping a work piece are coupled by a link mechanism to a fluid operated piston and cylinder assembly which opens and closes the jaws. The jaws and cylinder are mounted on a unitary support having a cavity therein within which the cylinder is received. The jaws and link mechanism are mounted on a head which is slidably carried on the support by guide rods fixedly secured to the head. The link mechanism includes an overcenter link arrangement which locks the jaws in a closed, gripping position in the event that the cylinder fails due to loss of fluid pressure.

4 Claims, 5 Drawing Figures

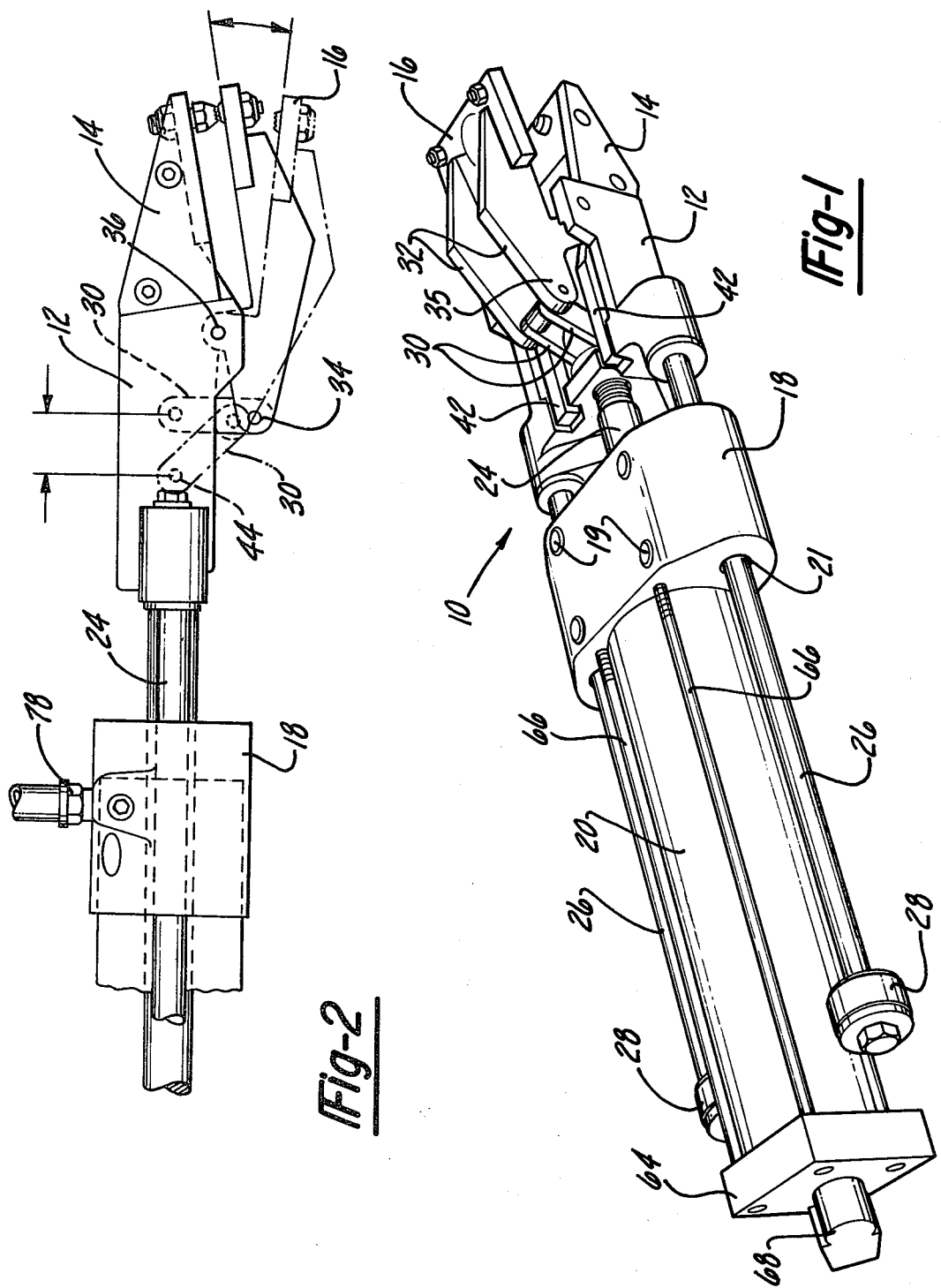

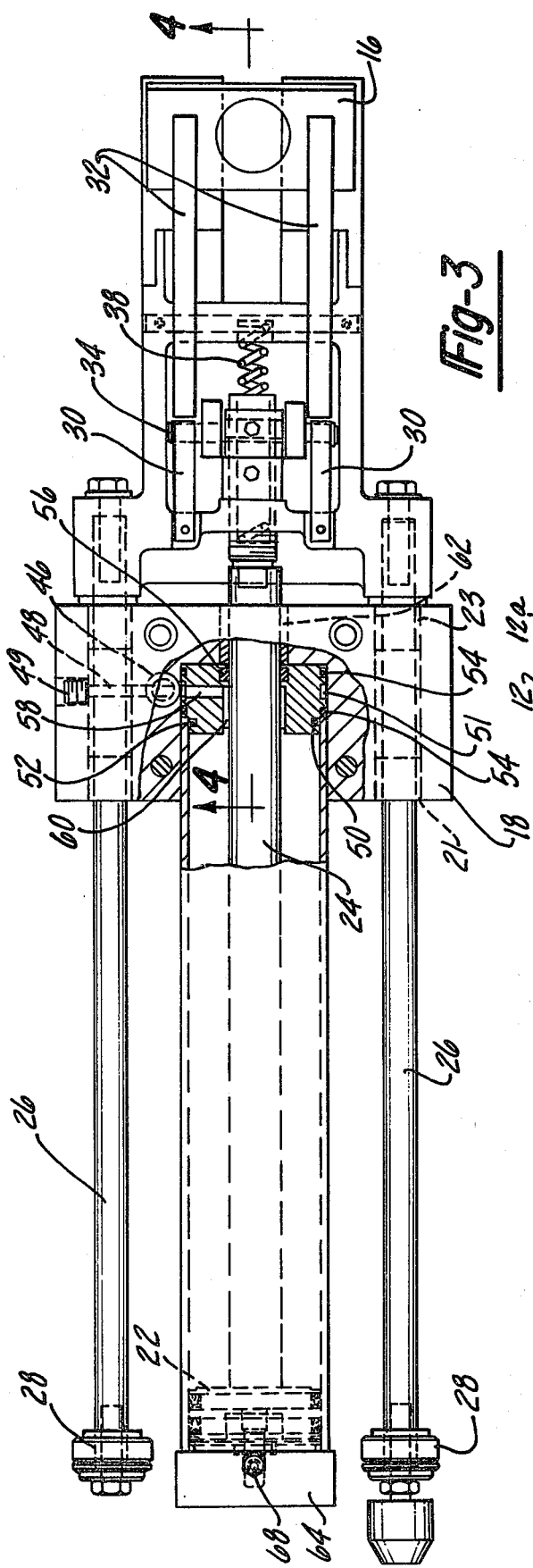

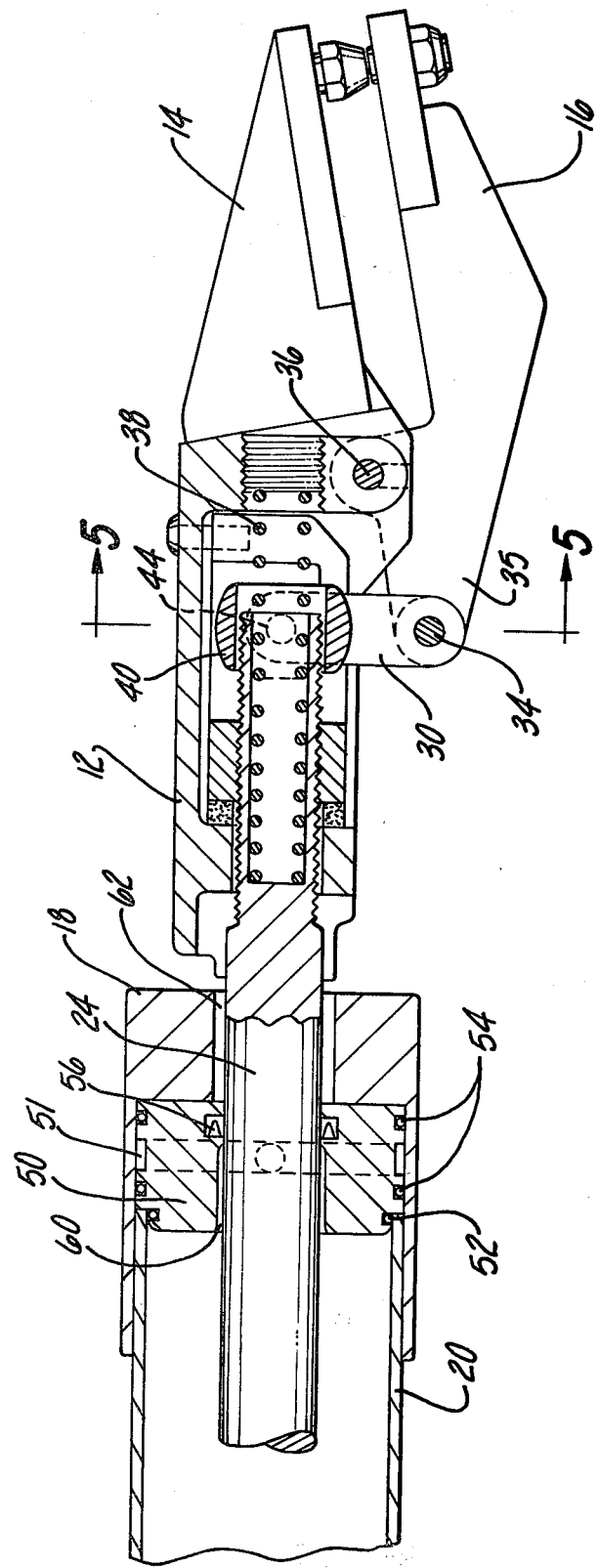

EXTENSIBLE MANIPULATOR UNIT

DESCRIPTION

1. Technical Field

The present invention broadly relates to apparatus for manipulating workpieces, particularly the type having a pair of actuatable gripping jaws, and deals more particularly with a unit for controlling and actuating the jaws.

2. Background Art

Mechanisms for repetitively gripping and manipulating workpieces are commonly employed in the field of robotics. Because of the trend toward increased use of robot devices, there is a need for gripping and actuating mechanisms that possess a high degree of flexibility, but yet which are relatively lightweight to allow the devices to lift heavy workpieces when mounted in a cantilever fashion.

One type of known gripping mechanism and actuating unit consists of a pair of jaws coupled by a link mechanism to the output shaft of a piston and cylinder combination which is driven by pressurized fluid. The cylinder is of conventional design and is mounted on one end of a multi-piece support which in turn is secured to a robot arm or the like. A pair of guide rods are fixedly secured to a support and are slidably received within appertures in a mounting head on which the jaws are mounted so as to guide the movement of the jaws.

One disadvantage of the unit described immediately above involves the fact that it is necessary to provide constant fluid pressure in the cylinder in order to maintain the jaws in a closed, gripping position. In the event of failure of the cylinder due to a loss of fluid pressure, the jaws are deactuated thus loosing a grip on the workpiece; this situation is particularly hazardous when the workpiece is being transferred during machining or assembly operations.

Another disadvantage of the prior art unit resides in the mounting arrangement of thhe cylinder on the support. One end of the cylinder includes a cap which abuts one face of the support. This arrangement not only increases the length and weight of the unit but also resulted in an assembly which is not exceptionally rigid.

It is therefore a primary object of the present invention to provide an improved apparatus for handling a workpiece which includes a link arrangement coupling the jaws to the cylinder which locks the jaws in a closed gripping position even if fluid pressure in the cylinder is lost.

Another object of the invention is to provide apparatus as described above which includes an improved arrangement for mounting the cylinder on a support.

A still further object of the invention is to provide apparatus as described above in which the jaws are guided by rods slidably mounted on the support.

These, and further objects of the invention will be made clear or will become apparent during the course of a description of the invention set out hereinbelow.

DISCLOSURE OF THE INVENTION

In accordance with the present invention, apparatus for manipulating a workpiece includes a pair of gripping jaws mounted on a head carrying a link assembly. The head is mounted for sliding movement on a support by guide rods secured to the head and slidably received within bores extending through the support. A cylinder having a fluid operated piston reciprocably disposed therewithin is mounted within a cavity in the support. A reciprocable drive rod connected with the piston is attached to the link assembly in order to open and close the jaws. The link assembly includes an overcenter feature which locks the jaws in a closed, gripping position in the event that fluid pressure in the cylinder is lost.

BRIEF DESCRIPTION OF THE DRAWINGS

In the drawings, which form an integral part of the specification and are to be read in conjunction therewith and in which like reference numerals are employed to designate identical components in the various views:

FIG. 1 is a top, perspective view of the improved extensible manipulator unit which forms the preferred embodiment of the present invention;

FIG. 2 is a longitudinal, fragmentary view of the forward portion of the unit showing the jaws in a closed position, the open position of the jaws and associated link being indicated in the phantom;

FIG. 3 is a top plan view of the unit shown in FIG. 1, parts being broken away in section to show the mounting relationship between the cylinder and support;

FIG. 4 is a sectional view taken along the line 4—4 in FIG. 3; and,

FIG. 5 is a sectional view taken along the line 5—5 in FIG. 4.

BEST MODE FOR CARRYING OUT THE INVENTION

Referring to the drawings, the present invention is broadly concerned with an improved unit for handling a workpiece (not shown) broadly indicated by the numeral 10 in FIG. 1.

Unit 10 includes a pair of opposed gripping jaws 14 and 16 mounted on a head 12 which in turn is reciprocably mounted on a support 18. Support 18 may be mounted by any suitable means on stationary or movable structure such as robot apparatus.

Jaw 14 is secured to and may form an integral part of mounting head 12 which comprises a U-shaped body within which there is mounted a later discussed linkage assembly. Head 12 includes a base 12a and a pair of spaced apart sides 12b, 12c extending outwardly from the base 12a. Jaw 16 includes a pair of spaced apart, parallel mounting plates 32 each secured for pivotal movement on head 12 by means of a pivot pin 36. Elongate extensions 35 at the rear of plates 32 are pivotally coupled by pivot pin 34 to one end of each of a pair of elongate drive links 30. The opposite ends of drive links 30 are pivotally connected to a shaft 44. Shaft 44 includes a pair of gibs 40 on opposite ends thereof which are slidably confined for longitudinal movement in ways 42 which are secured to mounting head 12. A mounting block 45 is secured to shaft 44 and includes a threaded central aperture for conjugally receiving the threaded outer end of a longitudinally extending drive rod 24.

Support 18 is preferably of unitary construction, manufactured as by casting or the like, and is provided with an upper surface having suitable means, such as threaded apertures 19 for mounting the unit 10 on a support or the like. A pair of spaced apart, longitudinally extending bores 21 in opposite sides of the support 18 are provided with bushings 23 for slidably receiving a pair of guide rods 26. One end of each guide rod 26 is fixedly secured to mounting head 12, the opposite end thereof being provided with stops 28 which engage a face of support 18 to limit the extension of mounting head 12.

The end of drive rod 24 opposite mounting head 12 is secured to a piston 22 which is slidably confined within a cylinder 20. One end of cylinder 20 is received within a cylindrically shaped cavity in one face of support 18. The opposite end of cylinder 20 is closed by a mounting plate 64. A plurality of tie rods 66 having the opposite ends secured to the support 18 and mounting plate 64 respectively draw plate 64 against cylinder 20 to securely mount cylinder 20 on support 18. A fluid fitting 68 is mounted within an aperture in plate 64 and is adapted to be coupled with a source of pressurized fluid such as air. One side of piston 22 in cylinder 20 is therefore in communication with the fluid entering or leaving fitting 68. Fluid is delivered into the cylinder 20 on the other side of piston 22 by means of a second fitting 78 also coupled with the fluid supply source. Fitting 78 is secured within a fluid passageway 46 in one face of support 18 opposite that side thereof including apertures 19. The passageway 46 is dogleg in shape and is partially defined by a bore 48 which extends radially from the outer surface of support 18 into a cavity therewithin. Bore 48 is closed at its outer end by a plug 49 and is provided merely to facilitate the production of an offset in passageway 46.

The inner end of cylinder 20 is closed by means of an annular cap 50 having an outer diameter essentially identical to that of the cavity within support 18.

Cap 50 is trapped between the end of the cavity and support 18 and the end of cylinder 20 and creates a fluid tight seal therebetween by means of a pair of O-rings 54 between the outer cylindrical surface of cap 50 and support 18, as well as an O-ring 52 between cap 50 and the end of cylinder 20. A circumferentially extending groove 51 in the outer surface of cap 50 registers with passageway 46 and communicates with the interior of cylinder 20 by means of a radially extending passageway 58 and an annular clearance 60 between drive rod 24 and the inner diameter of cap 50. It may therefore be appreciated at this point that pressurized fluid may enter or leave the forward end of the cylinder via clearance space 60, passageways 46 and 58 and fitting 78. Drive rod 24 extends through a bore 62 in the forward end of support 18 adjacent the cavity therein. A wiper element 56 in cap 50 prevents the escape of fluid from cylinder 20 through bore 62.

In use, the jaws 14 and 16 are normally open when head 12 is in a retracted position, as shown in FIG. 1. Delivery of fluid under pressure into the outer end of cylinder 20 forces piston 22 forward, thus extending drive rod 24 and head 12. Jaws 14 and 16 remain open during outward displacement of head 12 as a result of a spring 38 which normally biases the drive rod 24 rearwardly away from mounting head 12. However, when stops 28 engage support 18, head 12 reaches the end of its stroke while drive rod 24 continues its extension. At the end of the stroke, continued extension of drive rod 24 overcomes the biasing influence of spring 38 and moves block 45 forwardly. Forward displacement of block 45 and shaft 44 displaces pivot pin 34 downwardly causing lower jaw 16 to pivot about pin 36 to a closed position. In the closed gripping position, the center line between pin 34 and shaft 44 is essentially perpendicular to the path of travel of shaft 44; consequently it may be appreciated that link 30 is in an overcenter position which locks the jaws 14, 16 in their closed gripping position, even if fluid pressure is lost in cylinder 20. Retraction of drive rod 24 unlocks link 30 from its overcenter position, thus permitting spring 38 to open jaw 16.

From the foregoing, it is apparent that the apparatus described above not only provides for the reliable accomplishment of the objects of the invention but does so in a particularly effective and economical manner. It is recognized, of course, that those skilled in the art may make various modifications or additions to the preferred embodiment chosen to illustrate the invention without departing from the spirit and scope of the present contribution of the art. Accordingly, it is to be understood that the protection sought and to be afforded hereby should be deemed to extend to the subject matter claimed and all equivalents thereof fairly within the scope of the invention.

We claim:

1. Apparatus for manipulating a workpiece, comprising:
   a fluid operated motor having a reciprocable output shaft;
   means for gripping said workpiece, including first and second jaws shiftable relative to each other between an open position and a closed position; and
   means for drivingly connecting said gripping means with said output shaft, including
   (1) a mounting head having a generally U-shaped cross section defined by a base and a pair of sides extending outwardly from said base, said first jaw being pivotally mounted on said head,
   (2) a pair of spaced apart guides each having a way therein and being mounted on said base between said sides,
   (3) a pair of gibs slideably mounted in said ways,
   (4) a shaft extending between and connected to each of said gibs,
   (5) a block drivingly connecting said shaft with said output rod, said block being disposed between and spaced inwardly from each of said guides, and
   (6) means connected between said shaft and said first jaw for pivoting said first jaw upon reciprocation of said output shaft.

2. The apparatus of claim 1, wherein said connecting means includes a pair of drive links having the opposite ends thereof respectively pivotally connected to said shaft and said first jaw.

3. The apparatus of claim 2, wherein said links are respectively disposed between said block and said ways.

4. The apparatus of claim 1, wherein said block is spaced from said base.

* * * * *